United States Patent [19]
Zipilivan et al.

[11] 3,817,379
[45] June 18, 1974

[54] DISPOSABLE LIQUID CONCENTRATING DEVICE

[75] Inventors: Eliseo M. Zipilivan, Chelmsford; William F. Blatt, Winchester; Herbert H. Loeffler, Arlington, all of Mass.

[73] Assignee: Amicon Corporation, Lexington, Mass.

[22] Filed: July 10, 1972

[21] Appl. No.: 270,011

[52] U.S. Cl. .................. 210/94, 210/321, 210/346
[51] Int. Cl. ......................................... B01d 31/00
[58] Field of Search ........ 210/23, 94, 321, 505, 346

[56] References Cited
UNITED STATES PATENTS

| | | | |
|---|---|---|---|
| 2,144,781 | 1/1939 | Seitz | 210/505 X |
| 2,614,655 | 10/1952 | Katz | 210/505 X |
| 2,879,207 | 3/1959 | Poitras | 210/94 X |
| 3,367,505 | 2/1968 | Bray | 210/505 X |
| 3,397,785 | 8/1968 | Jarvis et al. | 210/346 X |
| 3,591,493 | 7/1971 | Zeineh | 210/32 X |
| 3,640,388 | 2/1972 | Ferrari | 210/94 |
| 3,670,892 | 6/1972 | Baerg et al. | 210/321 X |
| 3,731,806 | 5/1973 | McCormick | 210/94 |
| 3,742,946 | 7/1973 | Grossman | 210/321 X |

*Primary Examiner*—Frank A. Spear, Jr.

[57] ABSTRACT

A disposable device for concentrating liquid specimens by filtration or ultrafiltration having a chamber with one wall formed of a membrane permeable to the liquid vehicle of the specimen and a layer of solid absorbent material preferably in the form of a coherent sheet of fibrous material resiliently pressed against the membrane outside of the chamber. The front wall of the chamber is preferably rigid and transparent to facilitate determination of specimen size. The lower portion of each membrane wall is preferably blanked off with a sheet of impervious material.

9 Claims, 4 Drawing Figures

3,817,379

PATENTED JUN 18 1974

DISPOSABLE LIQUID CONCENTRATING DEVICE

This invention relates to a device for concentrating liquid specimens by filtration or ultrafiltration through a permeable membrane, more particularly a device for rapid concentration of small analytical specimens of liquid materials.

Effective use of modern analytical techniques for rapid analysis of liquid specimens, particularly biological specimens such as plasma, whole blood, cerebrospinal fluid, or urine, while requiring only small specimens, does require for best results the use of specimens in which the concentration of active material is substantially greater than that of the naturally occurring liquid specimen. It has previously been proposed to use dialysis or ultrafiltration for concentration of liquid specimens, but devices such as that of Rigopulos U.S. Patent 3,488,768 and Loeffler U.S. Pat. No. 3,565,256 require expensive auxiliary equipment to induce flow through the membrane in addition to necessitating the cleaning of the specimen chamber after each use. Although it has been proposed to replace the auxiliary equipment, in the case of dialysis, with a strong solution of high molecular weight material to which the membrane is impermeable or with powdered polyethylene glycol as proposed by Kohn, Nature, 183, 1,055 (1959), or in the case of ultrafiltration with a variety of dessicants, Grossman, Journal of Applied Physiology 32, 283-4 (1972), such devices are cumbersome, nonuniform in results produced, and incapable of providing concentration to a desired accurately predetermined extent without careful and close attention by an operator.

The device of the present invention overcomes the difficulties and disadvantages of the prior art and is in the form of a simple and inexpensive device capable of providing uniform concentration of samples in a short time without the necessity of expensive auxiliary equipment and with minimum attention from an operator. In a preferred embodiment, it provides two or more specimen chambers for independent concentration of specimens, which device can readily be shipped and stored in a ready-to-use condition and which is capable of concentrating at high speed while enabling the operator to achieve concentration to an accurately predetermined extent, and also, if desired, providing for automatic termination of the concentration. In view of its low cost, it can be disposable, i.e., it can be discarded after use.

A preferred embodiment of the invention is illustrated in the drawings in which

Figure 1:
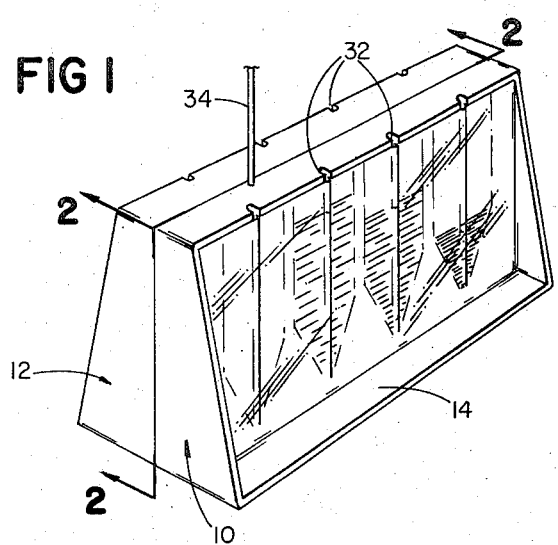
FIG. 1 is a view in perspective of a preferred embodiment.
Figure 2:
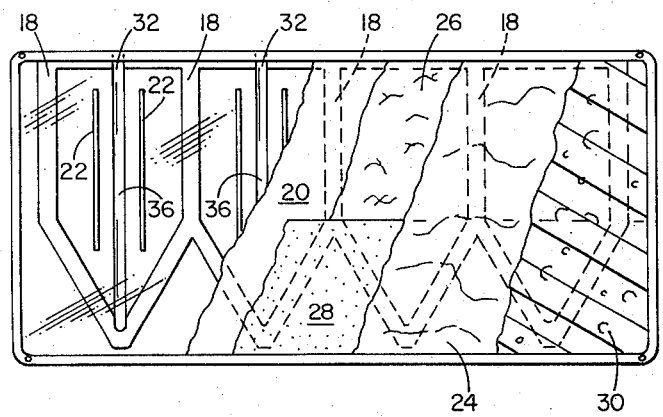
FIG. 2 is a view in vertical section partly broken away along lines 2—2 of FIG. 1.
Figure 3:
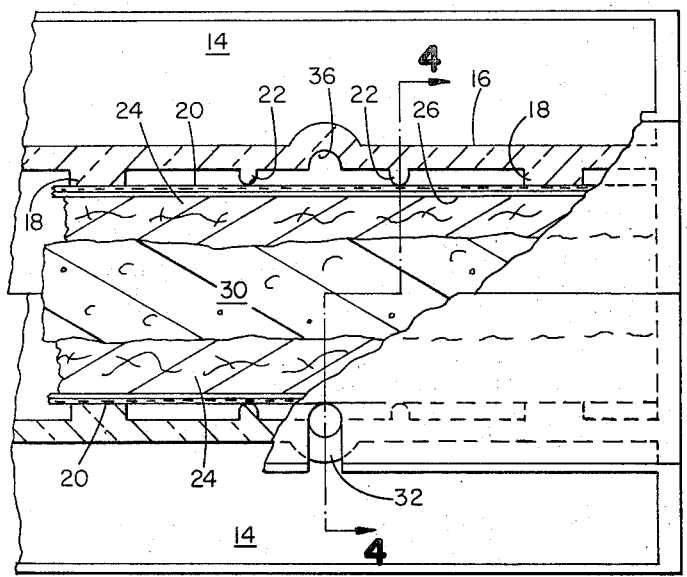
FIG. 3 is a view in horizontal section partly broken away on an enlarged scale.
Figure 4:
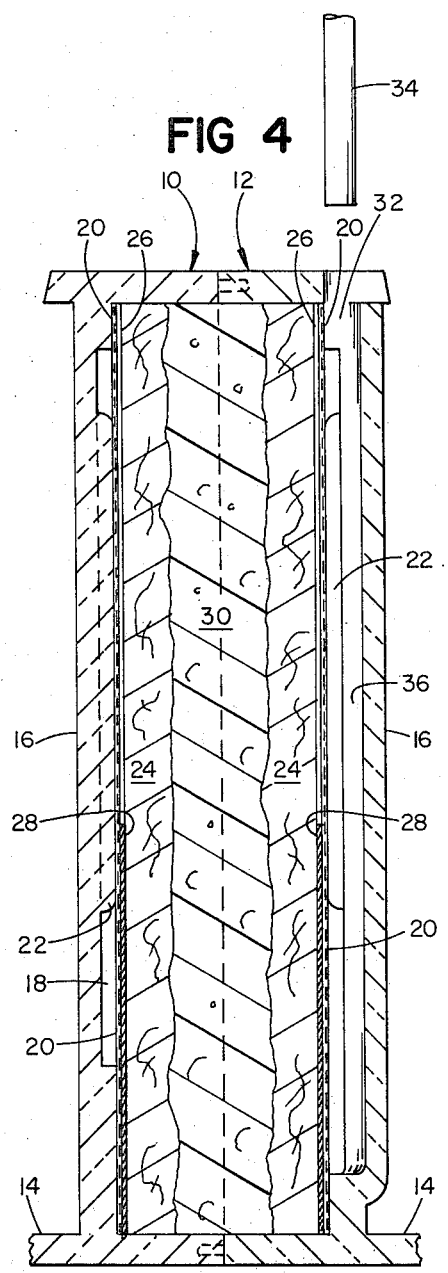
FIG. 4 is a view in vertical section along line 4—4 of FIG. 3.

As illustrated in the drawings, the device comprises a pair of identical molded plastic frame members 10, 12, each frame member forming a portion of four identical specimen chambers. Each frame member includes a base 14, a transparent front wall 16 and projecting partition walls 18 which, together with front wall 16, form three sides of each of the specimen chambers. A permeable membrane 20 extends along the length of each frame member, being bonded or sealed to each partition wall 18 by any suitable cement or adhesive or by heat sealing or ultrasonic sealing, and being maintained in spaced relation opposite front wall 16 by supporting members or ribs 22 which also project from front wall 16 and which terminate short of the top and bottom of the chamber to permit flow of the liquid specimen around them. The membrane may be of any conventional construction and formed of cellulosic or other polymeric material, being selected so as to be permeable to the liquid vehicle or vehicles in the liquid specimens to be concentrated while at the same time being impermeable to the active ingredients which it is desired to retain within the specimen. The size of the particles or solutes to be retained is a factor in selection of the membrane; i.e., ultrafiltration grade for dissolved solutes, membranes of greater pore size for particulates, such as blood cells; anisotropic membranes of the type described in U.S. Pat. No. 3,615,024 are generally preferred. Such membranes are commercially available under the trademark "Diaflo." The spacing between front wall 16 and membrane 20 is desirably kept small, of the order of 30 to 250 mils in order to maximize the ratio of membrane surface to chamber volume while minimizing capillary forces tending to restrain the passage of liquid vehicle through the membrane.

Disposed closely adjacent the surface of each membrane outside of the chamber is a layer of solid absorbent material 24. The absorbent material must be one which readily absorbs the liquid vehicle of the specimen to be concentrated and must be readily wet by the liquid vehicle. In the case of water, the most commonly encountered liquid vehicle, the absorbent material must be hydrophilic. While each layer 24 may be in the form of small discrete particles or powder of absorbent material such as silica gel or cross-linked dextran sold under the trade name Sephadex or even particles of polyethylene glycol which not only absorb a vehicle such as water, but dissolve in it, for best results both from the standpoint of stability during shipping and storing and uniformity of results in use, layers 24, 24 should be in the form of coherent and self-sustaining sheets of fibrous material which retain their shape and dimensions regardless of mechanical shocks to which the device may be subjected during shipment or use. Satisfactory results can be achieved by employing sheets of blotting paper or the like. Best results, in the case of specimens containing water as the vehicle, have been obtained with sheets of purified cellulose fibers obtained from wood pulp mixed with up to 10 to 20 percent by weight of asbestos fibers, the sheets being thick enough so that they are capable of absorbing the desired volume of liquid vehicle. The addition of the asbestos is found to enhance markedly the rate of passage of water through the membrane. In the case of a device in which the vehicle chambers are approximately 40 mils in thickness, excellent results have been obtained using fibrous absorbent sheets approximately 125 mils in thickness.

For maximum speed of removal of liquid vehicle through membrane 20, it is important that the spacing between each membrane and the corresponding layer 24 of absorbent material be as small as possible. Consequently, the surface of layers 24 should be very smooth; if not, small irregularities or roughness of the surface can be smoothed out by employing one or more layers of smooth thin tissue paper as a supplemental fibrous water absorbent layer 26 between each layer 24 and the surface of the corresponding membrane.

Means for automatically terminating withdrawal of liquid vehicle from the specimen is provided by applying to the lower portion of each membrane 20 along the bottom portion of the chambers a sheet 28 of impervious plastic material such as adhesive tape so that the lower portion of the chambers have completely impermeable walls for retaining a fixed volume of the specimen after removal of the desired quantity of vehicle has been completed.

The respective layers 24 and 26 of absorbent material are resiliently pressed against the surfaces of respective membranes 20 by interposing between sheets 24, 24, a sheet 30 of elastic resilient spongy material, for example, polyurethane sponge, then securing the adjacent margins of frame members 10 and 12 together around the periphery of the device. The layer of elastic sponge 30 not only serves to accommodate any irregularities in the surface of the respective layers 24 but is of such a thickness that it is somewhat compressed in thickness, preferably of the order of 20-25 percent, when the margins of frame members 10, 12 are sealed together. The sealing of the margins may be carried out in any conventional manner, for example, by heat sealing, solvent sealing, or simply by applying a layer of cement or an adhesive tape across the joint.

A restricted aperture 32 is provided at the upper margin of each chamber to permit introduction and withdrawal of the specimen by means of a pipet 34. This aperture is preferably of capillary dimensions so that spillage of the specimen is prevented in case the device is accidentally upset. In order to facilitate withdrawal of the concentrated specimen, the partition walls 18 defining the lower portion of each chamber are preferably sloped toward each other so that the bottom portion of each chamber is of triangular cross-sectional shape. In the embodiment shown in which the spacing between front wall 12 and membrane 20 is of the order of 40 mils, it is preferred to provide a channel 36 on the inner face of front wall 16 extending from aperture 32 to the bottom of the chamber. Channel 36 accommodates a pipet used for withdrawing the concentrated sample and minimizes the risk of accidental rupture of the membrane with consequent loss of some of the specimen during the withdrawal operation.

In constructing the device, the several membranes, absorbent sheets, etc. are assembled in the proper sequence, the membrane being bonded to partition walls 18, sponge layer 30 is inserted, and the two frame members 10, 12 are pressed together and sealed around their margins.

In using the device, a liquid specimen of the desired quantity is inserted into one of the chambers by means of a pipet, the total quantity of specimen being readily determinable simply by inspection through transparent front wall 16 (gradations may be provided on the wall if desired), and the device is allowed to stand until the desired proportion of liquid vehicle has been withdrawn from the sample through membrane 20 into absorbent layers 24, 26, a process which ordinarily requires from 1 to 2 hours. When the level of the liquid specimen has been lowered to the upper margin of impervious sheet 28, the withdrawal of the liquid vehicle is automatically terminated, leaving a precisely predetermined quantity of concentrated specimen in the lower portion of the chamber for removal at the convenience of the operator by means of a pipet.

What is claimed is:

1. An ultrafiltration device for removing liquid vehicle from a vehicle-containing specimen comprising a pair of chambers each having at least one rigid impermeable wall through which the amount of specimen in the chamber is visible and at least one wall opposed thereto formed of a membrane permeable to said vehicle, said chambers having their membrane walls in opposing spaced relation, a layer of solid absorbent material capable of sorbing said vehicle disposed closely adjacent each membrane between said chambers, a layer of resilient spongy material disposed between said layers of absorbent material, and means for clamping said chambers together with said spongy material under compression to press said layers of absorbent material against said membranes.

2. A device as claimed in claim 1 in which said absorbent material comprises a coherent sheet of fibrous material.

3. A device as claimed in claim 2 in which said fibrous material comprises a mixture of cellulose fibers with up to 20 percent by weight of asbestos fibers.

4. A device as claimed in claim 1 including supporting members within each said chamber to support each membrane in fixed spaced relation with respect to its opposing rigid wall.

5. A device as claimed in claim 4 in which each chamber has a restricted aperture at one margin of said rigid wall for introduction and removal of a specimen through a pipet.

6. A device as claimed in claim 5 in which each chamber has a portion remote from said aperture having completely impermeable walls for retaining a fixed volume of the specimen after removal of the desired quantity of vehicle through said membrane has been completed.

7. A device as claimed in claim 6 in which each said layer of solid absorbent material comprises a coherent sheet of fibrous material.

8. A device as claimed in claim 7 in which said fibrous material comprises a mixture of cellulose fibers with up to 20 percent by weight of asbestos fibers.

9. An ultrafiltration device for concentrating a specimen containing a liquid vehicle comprising a chamber, closed at the bottom, having a rigid impermeable wall through which the amount of specimen in the chamber is visible and another wall formed of a membrane permeable to the vehicle, a coherent sheet of fibrous material capable of sorbing said vehicle disposed closely adjacent said membrane outside said chamber, means for resiliently pressing said sheet of fibrous material against the outer face of said membrane, supporting members for supporting the inner face of said membrane in position, said chamber including a lower portion having completely impermeable walls for retaining a fixed volume of concentrated specimen when removal of the desired quantity of vehicle through said membrane has been completed and having an opening adjacent its upper end for introduction and removal of said specimen.

* * * * *